(12) United States Patent
Ogami

(10) Patent No.: US 7,443,444 B2
(45) Date of Patent: Oct. 28, 2008

(54) IMAGE PICKUP APPARATUS

(75) Inventor: Tetsuji Ogami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 618 days.

(21) Appl. No.: 10/909,323

(22) Filed: Aug. 3, 2004

(65) Prior Publication Data
US 2005/0030420 A1 Feb. 10, 2005

(30) Foreign Application Priority Data
Aug. 8, 2003 (JP) .............................. 2003-290154

(51) Int. Cl.
*H04N 5/225* (2006.01)
(52) U.S. Cl. ...................... 348/374; 348/376
(58) Field of Classification Search ................ 348/373, 348/374, 375; 257/432, 433, 434
See application file for complete search history.

(56) References Cited

U.S. PATENT DOCUMENTS

| | | | | |
|---|---|---|---|---|
| 6,649,991 B1 * | 11/2003 | Chen et al. | .................. | 257/433 |
| 6,686,588 B1 * | 2/2004 | Webster et al. | .............. | 250/239 |
| 7,180,546 B2 * | 2/2007 | Kobayashi | ................. | 348/374 |
| 2001/0050717 A1 * | 12/2001 | Yamada et al. | .............. | 348/340 |
| 2003/0124773 A1 * | 7/2003 | Hashimoto | ................... | 438/127 |
| 2003/0223008 A1 * | 12/2003 | Kim et al. | .................... | 348/340 |

\* cited by examiner

*Primary Examiner*—Ngoc-Yen T. Vu
*Assistant Examiner*—Albert H Cutler
(74) *Attorney, Agent, or Firm*—Fitzpatrick, Cella, Harper & Scinto

(57) ABSTRACT

In order to securely and easily perform electric connection in a circuit board, an image pickup apparatus comprises a solid-state image pickup element which picks up an image of a subject, a circuit board which is arranged on a back face of the solid-state image pickup element and includes a signal processing circuit, a holding member which is arranged between the solid-state image pickup element and the circuit board and holds the solid-state image pickup element, a first connector which is arranged on the circuit board and includes a plurality of electrodes and a first electrical insulation member provided so as to cover the plurality of electrodes, and a first connecting member which electrically connects the solid-state image pickup element and the first connector and includes a plurality of interconnections and a second electrical insulation member provided so as to cover the plurality of interconnections, wherein the first connecting member extends from the solid-state image pickup element toward an outside direction beyond an end portion of the holding member, and at least apart of the connecting member is bent.

4 Claims, 6 Drawing Sheets

IMAGE PICKUP APPARATUS

BACKGROUND OF THE INVENTION

1. Field of the Invention

The present invention relates to an image pickup apparatus having a solid-state image pickup element such as CCD.

2. Related Background Art

Various apparatuses which utilize a solid-state image pickup element to pick up an image of an object in an electronic manner have been developed. For example the image pickup apparatus using CCD (Charge Coupled Device) is utilized for an electronic camera and the like. In the conventional image pickup apparatus, the solid-state image pickup element is attached to a circuit board on which electric components are mounted. Through holes are made in the circuit board, leads and cables which extend from the solid-state image pickup element are inserted into the through holes and connected to the through holes by soldering or the like, thereby the electric connection is obtained.

However, since the provision of the through holes is required in the circuit board in the conventional solid-state image pickup apparatus, there is a problem that a component mounting area is reduced and complicated wiring avoiding the through holes is also required. There is another problem that an assembly operation is difficult because the through hole has a relatively small diameter and a connecting portion is not temporarily fixed to the circuit board. In the case where the cable is used as a connecting member, there is still another problem that an electric signal is weakened or the noise is generated because the cable which is unnecessarily longer is used in consideration of the assembly operation. Further, there is still another problem that the longer a cable length, the higher cost the cable is produced. In the case where the lead is used as the connecting member, there is a further problem that external force is applied to the solid-state image pickup element during operation for connecting it with the circuit board because the connecting member has no flexibility. Further, there is still another problem that a space in the electronic camera can not be effectively utilized because the circuit board is divided into the plurality of circuit boards in order to avoid the problem of the application of the external force.

SUMMARY OF THE INVENTION

It is an object of the invention to achieve miniaturization of the image pickup apparatus.

In order to achieve the above object, according to one aspect of the invention, an image pickup apparatus of the invention comprises a solid-state image pickup element which picks up an image of an object, a circuit board which is arranged on a back face side of the solid-state image pickup element, the circuit board including a signal processing circuit, a holding member which is arranged between the solid-state image pickup element and the circuit board and holds the solid-state image pickup element, a first connector which is arranged on the circuit board and includes a plurality of electrodes and a first electrical insulation member provided so as to cover the plurality of electrodes, and a first connecting member which electrically connects the solid-state image pickup element and the first connector and includes a plurality of interconnections and a second electrical insulation member provided so as to cover the plurality of interconnections, wherein the first connecting member extends from the solid-state image pickup element toward an outside direction beyond an end portion of the holding member, and at least apart of the connecting member is bent.

DETAILED DESCRIPTION OF THE PREFERRED EMBODIMENTS

First Embodiment

Figure 1:
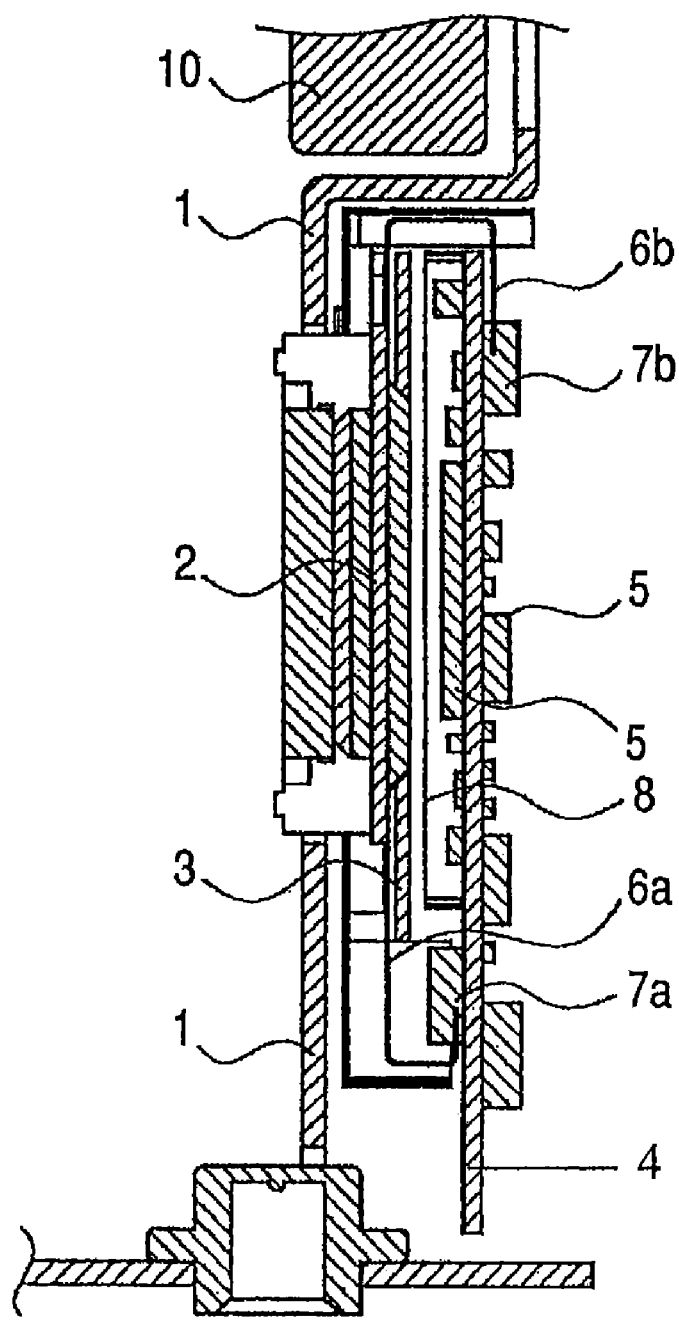
FIG. 1 is a schematic sectional view of a solid-state image pickup apparatus according to a preferred first embodiment of the invention.

FIGS. 1 to 4 show a schematic configuration of the electronic camera according to a preferred first embodiment of the invention. FIG. 1 is the sectional view of the solid-state image pickup apparatus according to the first embodiment.

In FIG. 1, the reference numeral 1 denotes a chassis of the electronic camera. The reference numeral 2 denotes a solid-state image pickup element which converts the light incident from an imaging lens (not shown) into the electric signal. The reference numeral 3 denotes a solid-state image pickup element holder which holds the solid-state image pickup element 2. The holder is attached to the chassis 1. The reference numeral 4 denotes a circuit board on which a group of circuit elements 5 are mounted. The group of circuit elements 5 drives the solid-state image pickup element 2, performs signal processing of the solid-state image pickup element 2, and drives the electronic camera. The reference numerals 6a and 6b denotes connecting portions made with a TAB (Tape Automated Bonding) tape on which the solid-state image pickup element 2 is mounted. Wiring for electrically connecting the solid-state image pickup element 2 and the circuit board 4 is installed in the TAB tape. The reference numerals 7a and 7b denotes connectors which electrically connect the connecting portions 6a and 6b extending from the solid-state image pickup element 2 and the circuit board 4 respectively. The reference numeral 8 denotes a shield member having electrical conductivity. The shield member 8 protects the group of circuit elements 5 mounted on the circuit board 4 and a wiring pattern (not shown) from external noise.

In order to suppress the weakening of the electric signal and the noise from other signals to the minimum level, it is desirable that TAB tape lengths are symmetrical with respect to the center of the solid-state image pickup element 2 and the TAB tapes are connected to the circuit board 4 by the minimum distance. There is technological advantages that the shorter the TAB tape length, the lower cost the TAB tape can be produced.

Figure 2:
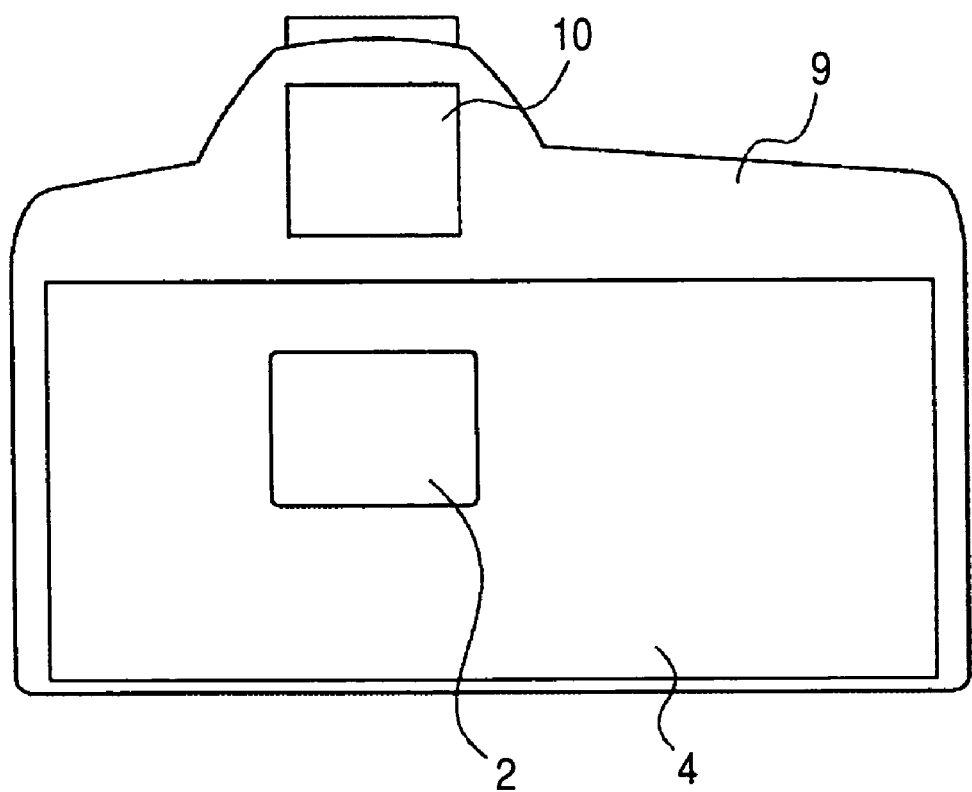
FIG. 2 is a schematic perspective view when seen from a back face of an electronic camera.

FIG. 2 is the perspective view when viewed from the back face of the electronic camera, and FIG. 2 shows an arrangement of the solid-state image pickup element and the circuit board in the electronic camera. In FIG. 2, in consideration of general holding characteristics of a main body 9 of the electronic camera, a grip (not shown) and a release button (not shown) are arranged on the right side of the center of the back face of the electronic camera, an imaging optical system (not shown) is arranged on the left side thereof, and a finder ocular optical system 10 is arranged on the vertically upper side of an optical axis of the imaging optical system. The solid-state image pickup element 2 is arranged in the center of the imaging optical system. Because the circuit board 4 is restricted by the finder ocular optical system 10, it is not expected that the circuit board 4 extends to the upper portion of the electronic camera. In order to increase efficiency of the use of the material and to reduce the cost, it is desirable that the circuit board 4 has a substantially rectangular shape. Therefore, it is effective that the circuit board 4 extends toward the lower direction and the horizontal direction of the electronic camera. At this point, in the connectors 7a and 7b which electrically connect the connecting portions 6a and 6b and the circuit board 4, the minimum distance side (upper side) from the center of the solid-state image pickup element 2 to an end portion of the circuit board 4 is mounted on the upper side of the back face of the electronic camera above the circuit board 4 (7a), and the symmetric side (lower side) is mounted on the lower side of a front face of the electronic camera (7b).

Figure 3:
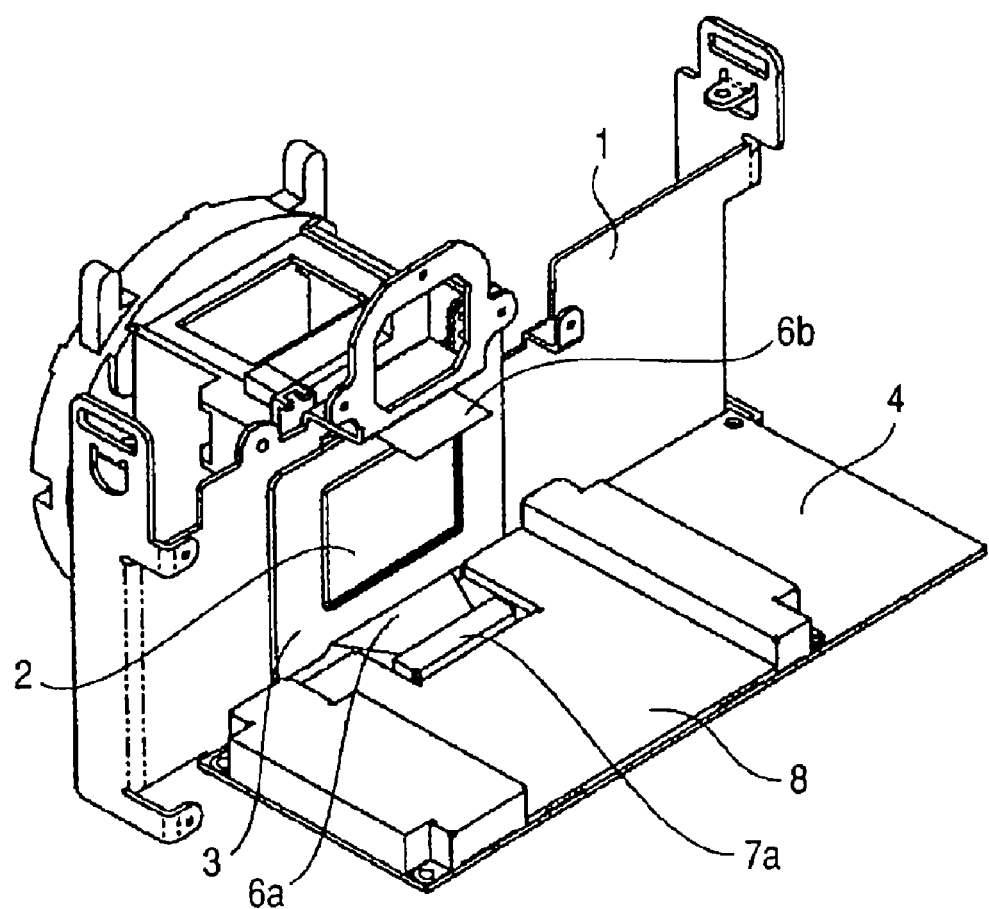
FIG. 3 is a first schematic view of an electronic camera system in which the solid-state image pickup apparatus of FIG. 1 is incorporated.

FIG. 3 is the schematic view of the electronic camera system in which the solid-state image pickup apparatus is incorporated, and FIG. 3 is particularly the schematic view in which a lower portion of the connecting member is connected to the circuit board.

Figure 4:
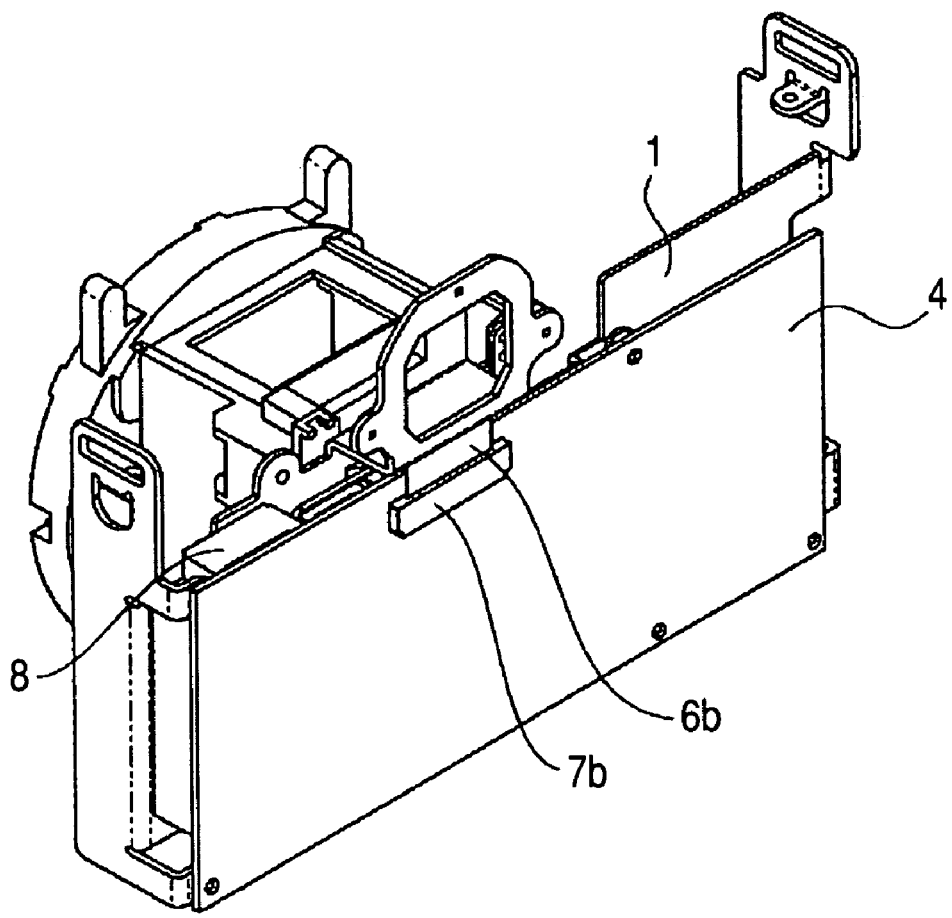
FIG. 4 is a second schematic view of the electronic camera system in which the solid-state image pickup apparatus of FIG. 1 is incorporated.

FIG. 4 is the schematic view of the electronic camera system in which the solid-state image pickup apparatus is incorporated, and FIG. 4 is particularly the schematic view in which an upper portion of the connecting member is connected to the circuit board. Referring to FIGS. 3 and 4, a structure in which the solid-state image pickup apparatus is incorporated will be described.

In FIG. 3, the solid-state image pickup element 2 mechanically attached to the solid-state image pickup element holder 3 is mechanically attached to the chassis 1 as a solid-state image pickup element unit. The TAB tape connecting portions 6a and 6b extend toward the vertical upper and lower directions of the electronic camera with their lengths symmetrical with respect to the center of the solid-state image pickup element 2. The connectors 7a and 7b are mounted on the circuit board 4. While the connectors 7a and 7b are arranged outside the shield member 8, the connector 7a is arranged on the lower side of the front face of the electronic camera and the connector 7b is arranged on the upper side of the back face of the electronic camera.

Then, the structure in which the solid-state image pickup apparatus is incorporated will be described in accordance with an attaching sequence.

The TAB tape connecting portion 6a is first connected to the connector 7a. At this point, as shown in FIG. 3, the circuit board 4 is not fixed to the chassis 1. Then, as shown in FIG. 4, the circuit board 4 is rotated to be fixed to the chassis 1 with screws or the like so that the connected TAB tape connecting portion 6a and connector 7a are arranged in the front face of the electronic camera. At this point, the TAB tape connecting portion 6b is connected to the connector 7b as shown in FIG. 4.

The TAB tape connecting portion 6a is connected to the connector 7a which is provided on the circuit board 4 and on the upper side of the front face of the electronic camera, the TAB tape connecting portion 6b is connected to the connector 7b which is provided on the circuit board 4 and on the lower side of the back face of the electronic camera, and the lengths in the vertical upper and lower directions of the TAB tapes are symmetrical. Therefore, the electrical connection can be securely and easily performed in the circuit board 4, while the lengths of connecting portions 6a and 6b are not extended unnecessarily. Further, the large circuit board having good workability can be mounted without dividing the circuit board 4.

Second Embodiment

Figure 5:
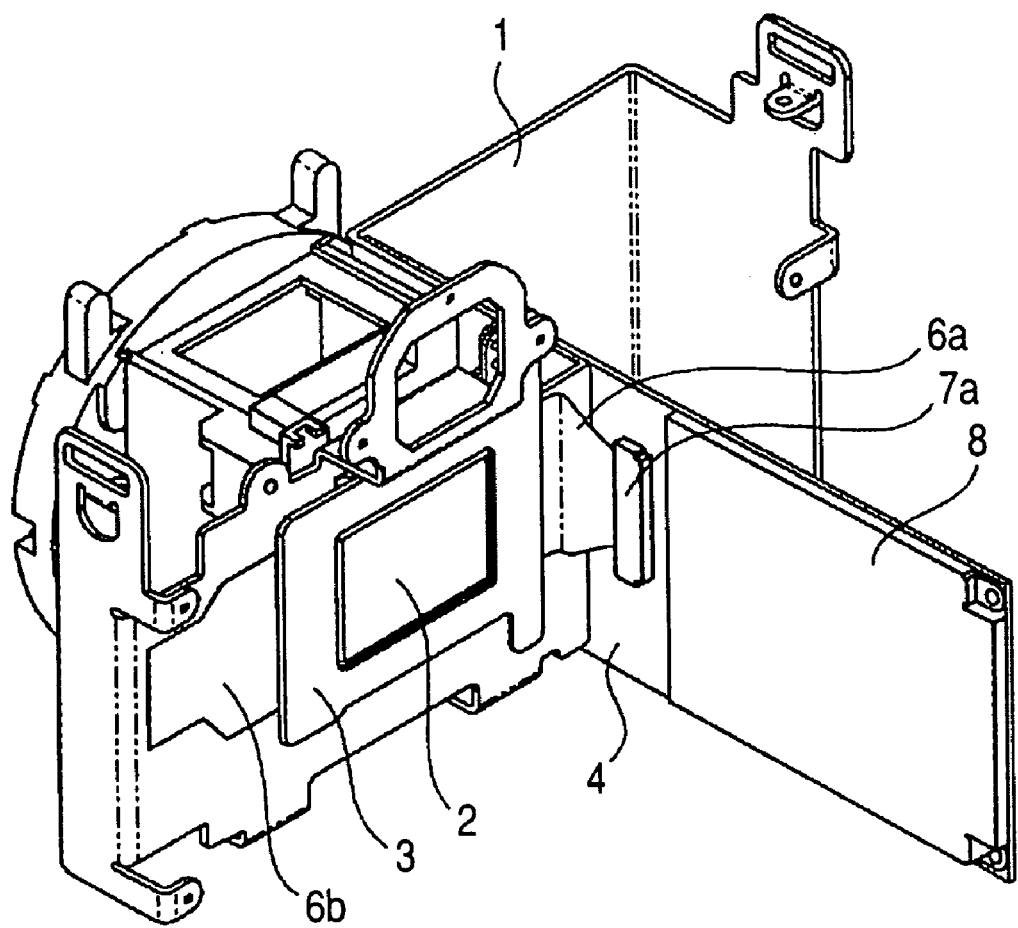
FIG. 5 is a first schematic view of the electronic camera system in which the solid-state image pickup apparatus adopted in a second embodiment is incorporated.
Figure 6:
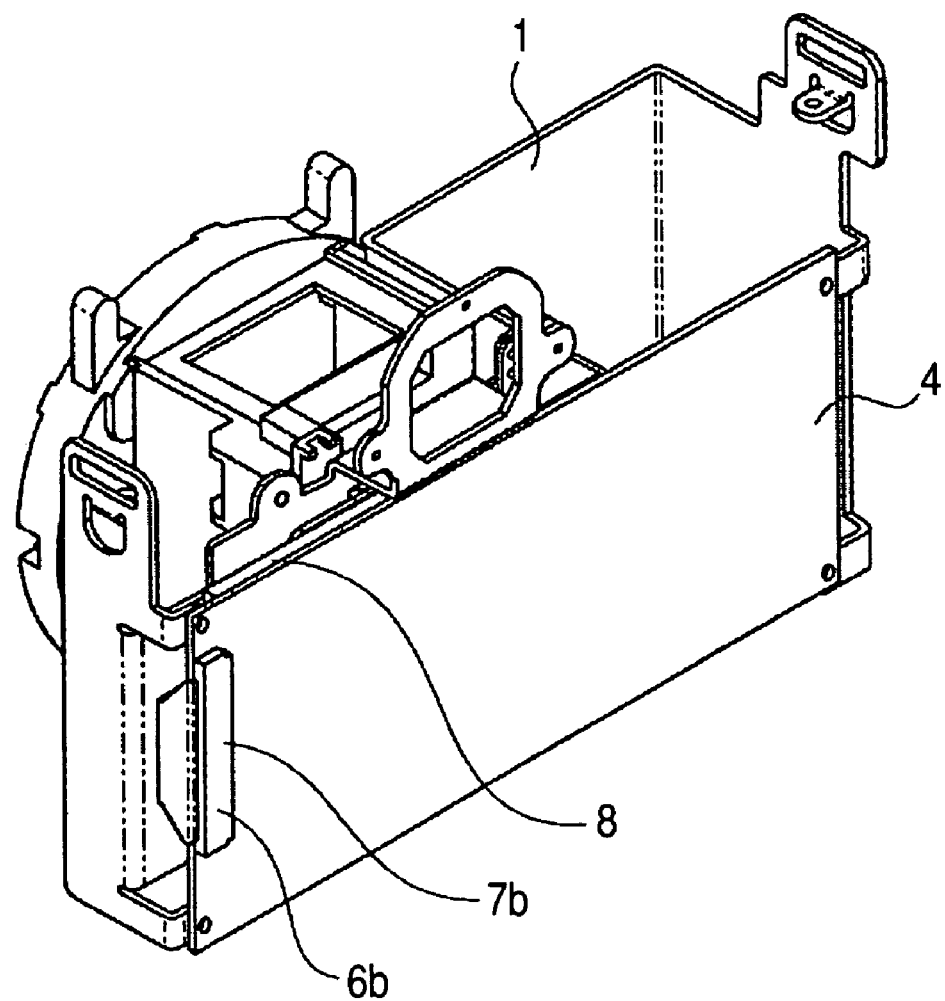
FIG. 6 is a second schematic view of the electronic camera system in which the solid-state image pickup apparatus adopted in the second embodiment is incorporated.

FIGS. 5 and 6 are the schematic view of the electronic camera system in which the solid-state image pickup apparatus is incorporated according to a second embodiment.

FIG. 5 is the schematic view of the electronic camera system in which the solid-state image pickup apparatus is incorporated, and FIG. 5 is particularly the schematic view in which the right side of the connecting member is connected to the circuit board.

FIG. 6 is the schematic view of the electronic camera system in which the solid-state image pickup apparatus is incorporated, and FIG. 6 is particularly the schematic view in which the left side of the connecting member is connected to the circuit board.

Referring to FIGS. 5 and 6, the structure in which the solid-state image pickup apparatus is incorporated will be described.

In FIGS. 5 and 6, the description of the same reference numeral as the first embodiment will be omitted.

In FIG. 5, the solid-state image pickup element 2 mechanically attached to the solid-state image pickup element holder 3 is mechanically attached to the chassis 1 as a solid-state image pickup element unit. In order to increase strength of the main body 9 of the electronic camera, the chassis 1 is formed in the shape corresponding to that of the grip of the electronic camera. The TAB tape connecting portions 6a and 6b extend toward the horizontal right and left directions of the electronic camera with their lengths symmetrical with respect to the center of the solid-state image pickup element 2. The connectors 7a and 7b are mounted on the circuit board 4. While the connectors 7a and 7b are arranged outside the shield member 8, the connector 7a is arranged on the right side of the front face of the electronic camera and the connector 7b is arranged on the left side of the back face of the electronic camera.

Then, the structure in which the solid-state image pickup apparatus is incorporated will be described in accordance with the attaching sequence of the circuit board 4.

The TAB tape connecting portion 6a is first connected to the connector 7a. At this point, as shown in FIG. 5, the circuit board 4 is not fixed to the chassis 1. Then, as shown in FIG. 6, the circuit board 4 is rotated to be fixed to the chassis 1 with screws or the like so that the connected TAB tape connecting portion 6a and connector 7a are arranged in the front face of the electronic camera. At this point, the TAB tape connecting portion 6b is connected to the connector 7b as shown in FIG. 6.

In the case where the chassis 1 is formed in the shape corresponding to that the grip of the electronic camera, the TAB tape connecting portion 6a is connected to the connector 7a which is provided on the circuit board 4 and on the right side of the front face of the electronic camera, the TAB tape connecting portion 6b is connected to the connector 7b which is provided on the circuit board 4 and on the left side of the back face of the electronic camera, and the lengths in the horizontal right and left directions of the TAB tapes are symmetrical. Therefore, the electrical connection can be securely and easily performed in the circuit board 4, while the lengths of the connecting portions 6a and 6b are not extended unnecessarily. Further, the large circuit board having good workability can be mounted without dividing the circuit board 4.

As described above, according to the first and second embodiments, the lengths in the vertical upper and lower directions of the TAB tapes are symmetrical or the lengths in the horizontal right and left directions of the TAB tapes are symmetrical, so that the electrical connection can be securely and easily performed in the circuit board while the lengths of the connecting members are not extended unnecessarily. Further, the large circuit board having good workability can be mounted without dividing the circuit board.

Many widely different embodiments of the present invention may be constructed without departing from the spirit and scope of the present invention. It should be understood that the present invention is not limited to the specific embodiments described in the specification, except as defined in the appended claims.

This application claims priority from Japanese Patent Application No. 2003-290154 filed Aug. 8, 2003, which is hereby incorporated by reference herein.

What is claimed is:

1. An image pickup apparatus comprising:
   a) an image pickup element which picks up an image of an object;
   b) a connecting member arranged to be electrically connected to said image pickup element, said connecting member having two connection portions each of which is formed extendedly;
   c) a holding member which holds said image pickup element electrically connected to said connecting member; and
   d) a circuit board which is arranged facing said holding member, said circuit board including a signal processing circuit and also including a first connector mounted on a front surface of said circuit board so as to be connectable to one of said two connection portions of said connecting member, and a second connector mounted on a surface of said circuit board, opposite to said front surface, so as to be connectable to the other of said two connection portions of said connecting member,
   wherein one of said two connection portions, which is formed to extend toward an end side of said circuit board so that the distance from said end side of said circuit board to the center of said image pickup element is shorter than the distance from another end side of said circuit board to the center of said image pickup element, is turned down at said end side of said circuit board to connect to said second connector.

2. An image pickup apparatus according to claim 1, wherein the length of each of the two connection portions of said connecting member is the same.

3. An image pickup apparatus according to claim 2, further comprising:
   a shielding member which shields a surface of said circuit board, which surface faces said holding member, said shielding member being arranged so as not to shield said first connector.

4. An image pickup apparatus according to claim 1, wherein said first and second connectors are arranged on said circuit board so that said one of said two connection portions, which is formed to extend toward the end side of said circuit board so that the distance from said end side of said circuit board to the center of said image pickup element is shorter than the distance from said another end side of said circuit board to the center of said image pickup element, is turned down at said one side of said circuit board to connect to said second connector after said other of said two connection portions is connected to said first connector.

* * * * *